Feb. 14, 1961 WILLIAM RICHARD SCHMITZ 2,971,603
APPARATUS FOR TREATING MATERIAL FOR MAKING ARTIFICIAL FIBERS
Filed April 17, 1958 2 Sheets-Sheet 1
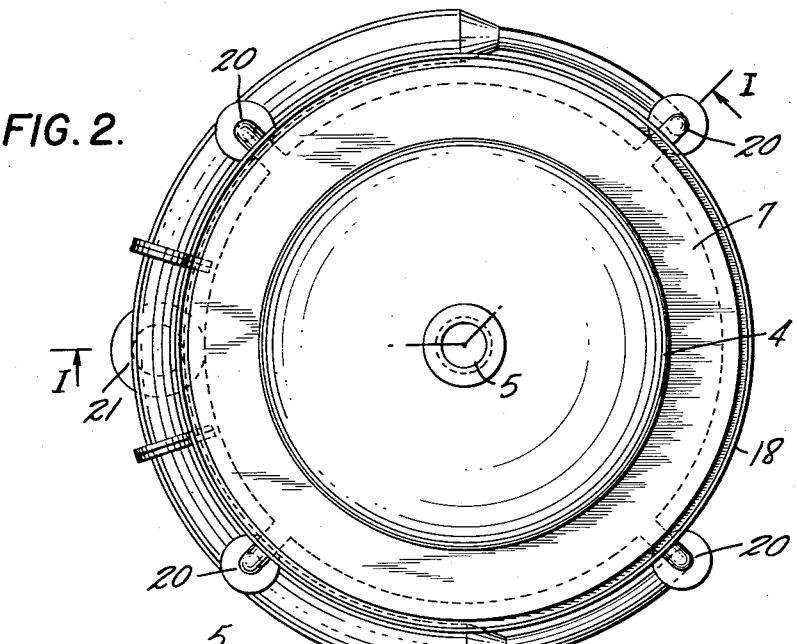
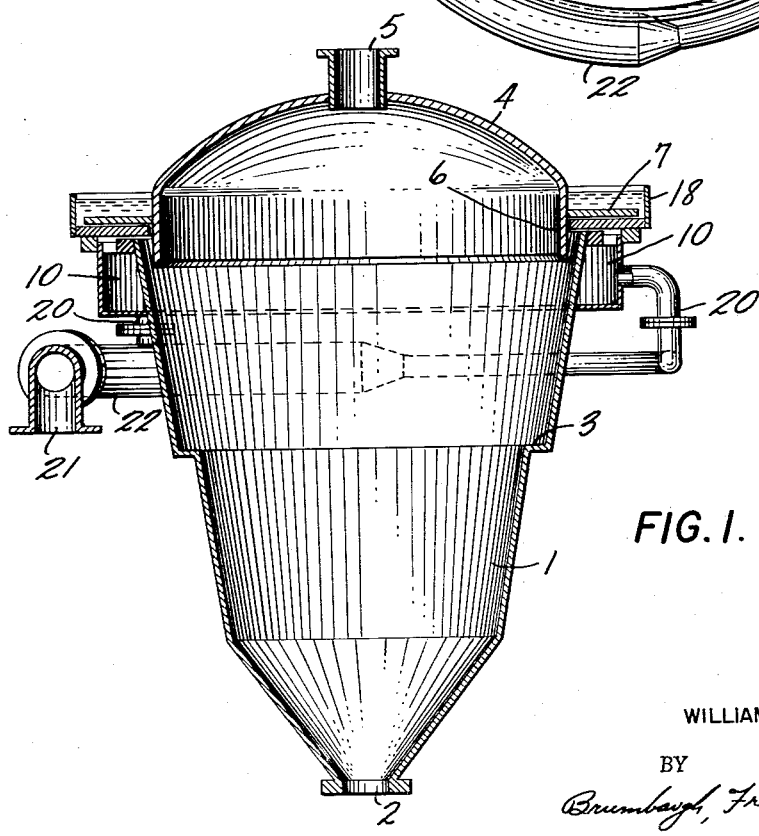
INVENTOR.
WILLIAM RICHARD SCHMITZ
BY
ATTORNEYS.

United States Patent Office 2,971,603
Patented Feb. 14, 1961

2,971,603
APPARATUS FOR TREATING MATERIAL FOR MAKING ARTIFICIAL FIBERS

William Richard Schmitz, 4 Yonbancho, Chiyoda-ku, Tokyo, Japan

Filed Apr. 17, 1958, Ser. No. 729,162

Claims priority, application Japan Apr. 30, 1957

4 Claims. (Cl. 183—2.5)

This invention relates to an apparatus for treating material for making artificial fibers and, more particularly, to an apparatus for deaerating viscose solution.

In the manufacture of artificial fibers, particularly by the viscous process, it is necessary to remove all air and vapor bubbles in the viscose solution prior to extruding it through the spinnerette. Otherwise, the gas bubbles will cause a break in the filament or will result in other disadvantages. Furthermore, a gas bubble will sometimes permit the coagulating liquor to pass into the holes of the spinnerette and coagulate the viscose at its entrance, thereby clogging the hole.

In the past, it has been customary to store the viscose or spinning dope in tanks under vacuum for an extended period of time, during which time the air or gas rises to the surface and is removed. This extended period of time usually is in the order of 16–24 hours and not only necessitates a large investment in equipment for handling such a large quantity of viscose as represented by 16–24 hours production, but also necessitates the added refrigeration to keep the viscose at a lower temperature so that the ripening reaction is retarded to give sufficient time for the removal of the gas.

Certain apparatuses for the continuous removal of air have been utilized in which the viscose is streamed by some means through a vessel under a vacuum, and the air bubbles, expanding under the reduced pressure, break to the surface. However, these apparatuses usually do not operate effectively due to their inability to give uniform distribution of a film of viscose around the walls of the vessel. Further, if a break in the film occurs, drying develops along the edge of the stream, and gradually a skin is built up, thereby resulting in the disadvantage that eventually the skin must be removed by shutting down and cleaning the apparatus. Accordingly, a principal object of the invention is to provide an apparatus which overcomes the above disadvantages.

Another object of the present invention is to provide a low cost apparatus for deaeration, which structure permits it to be constructed easily and accurately in a conventional machine shop, and which permits a uniform film of viscose to stream down the entire wall of the deaerating vessel, thereby making the deaerating operation easy and complete.

A further object of the invention is to provide an apparatus for treating viscose material to remove entrapped gases.

Generally, a structure according to the invention embodies a means for injecting viscose into an evacuated vessel such that entrapped gases are released. By a unique construction and arrangement of parts, the viscose is developed into a uniform, gas-free film along the inside surface of the vessel to a point where it is removed for subsequent use.

For a more complete understanding of these and other objects of the present invention, reference may be had to the description which follows and to the accompanying drawings in which:

Figure 1 is a sectional view in elevation of a structure according to the invention;

Figure 2 is a plan view of Figure 1; and

Figure 3:
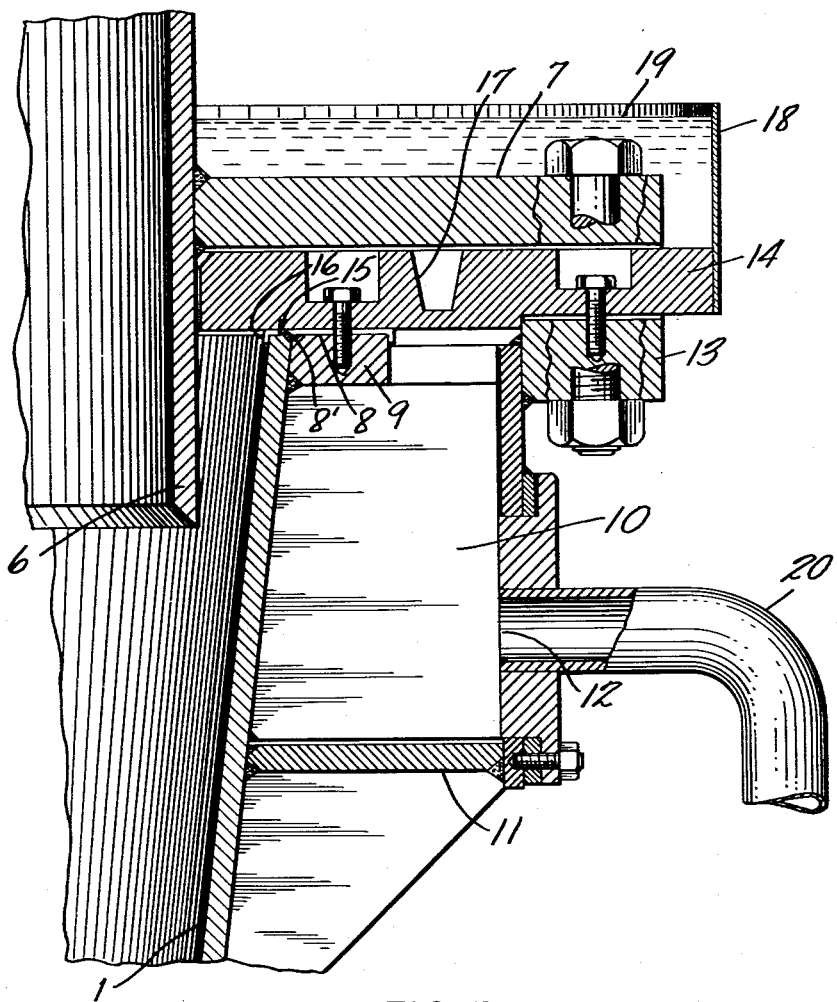
Figure 3 is an enlarged sectional view in elevation of a portion of Figure 1.

Referring to the drawings, the numeral 1 identifies a container or vessel having a viscose outlet 2 at its bottom. The inside of the vessel is constructed to have a conical shape, converging downwardly, and if desired, a horizontal step 3 may be provided as illustrated in the drawings. A dome shaped cover 4 has an opening 5 at the top and an annular, depending edge 6. The opening 5 is adapted to be connected to a suitable vacuum source (not shown).

The portion connecting the cover 4 with the vessel 1 is shown enlarged in Fig. 3. An annular flange 7 is welded at right angles to the periphery of the aforementioned flange or edge 6 midway of the depending portion. An annular girdle 9 is welded on the periphery of the vessel 1 and is finished so that the upper surface 8 of the girdle 9 forms a true horizontal plane on the same level as that of the upper edge 8' of the vessel 1. It is preferred that the flange 6 be substantially perpendicular to this surface 8.

Positioned on an annular manifold supporter 11 which is affixed rigidly on the periphery of the outer wall of the vessel 1 is an annular manifold 10 into which viscose is fed through inlet 12. In addition, an annular girdle 13 is welded on the upper portion of the outer periphery of the manifold 10. To hold an annular, ring-like cover 14 rigidly between the annular girdles 9 and 13 and the aforementioned annular flange 7, the cover 14 is attached, for example by suitable threaded bolts, to the upper surfaces of the two annular girdles 9 and 13.

Suitable sealing means, as for example packing material, a washer or a combination of the two, is employed between the cover 14 and the annular girdle 13 to prevent any possible leakage. Narrow, thin spacers 15 are inserted at the proper places between the annular girdle 9 and the cover 14 to maintain a slot 16. In this manner, the distance across the slot is determined by the thickness of the spacers 15. Therefore, this distance across the slot 16 can be changed, in accordance with the viscosity of viscose employed, by changing the spacer 15 for one of a different thickness.

A groove 17 is formed in the upper surface of the annular cover 14 and is provided for the purpose of giving resiliency to the cover as it is being held in place. An enclosure wall 18, welded to the peripheral edge of the annular cover 14, forms a channel or gutter bounded by the annular flange 7, the annular cover 14, and the cover edge 6. Any leakage between the above described members is prevented by filling the gutter with water or with any other liquid.

Referring again to Fig. 1, the annular manifold 10 shown at the upper left is the continuation of the annular manifold 10 at the right, explained hereinbefore. The viscose feeding branch pipes 20, as seen in Figures 1 and 2, are branched at several points from the main manifold 22 surrounding the vessel 1, the main manifold 22 being branched to both sides from a main pipe 21 (shown in Figure 2 as having four branch pipes 20). Of course, the present deaeration vessel 1 is provided with suitable gauges, such as, vacuum meter, pressure meter, pressure recorder, thermometer, thermorecorder, viscosity meter, viscosity recorder, sight glass and the like, and is coated with suitable anticorrosive paint or the like.

In operation, the opening 5 is connected with a suitable vacuum means (not shown) to evacuate the air in the vessel 1, and the viscose outlet 2 is connected to a spinning means (not shown). Then, by connecting the main pipe 21 to a supply of viscose, the viscose flows into the annular manifold 10 from the branch pipes 20 which, in turn, are supplied by the main manifold 22 until the manifold 10 is filled. The viscose will overflow and be pushed out through the slots 16. The distance across the slot 16 is such that a given pressure develops on the upstream side of the viscose. As the viscose passes through the slot 16, it turns into a foam due to the release of entrapped gas and then streams down along the inside conical wall of the vessel 1 by the pull of gravity. The edge 6 being in front of the viscose at the point of its entry into the vessel 1 prevents the spray of viscose, resulting from the bursting gas bubbles, from flying into the center of the vessel and into the inside of the cover 4. Since portions of the viscose film streaming down on the inside wall above the horizontal step 3 may be nonuniform, the step serves to collect and to redistribute the viscose as a uniform film. Only one step is shown in the drawings, but it is to be understood that more than one step may be provided, if desired. By reason of the step or steps and due to the inside wall of the vessel being tapered inwardly in a conical shape, the foam particles that sometimes break off from the main viscose stream or drop directly into the vessel are caught.

Inasmuch as the apparatus of the present invention is characterized by some or all of the following: (1) the maintenance of a constant pressure at the slot 16, (2) the adequate and accurate spacing of the slot 16, (3) the edge 6 (perpendicular shroud), (4) the inverted conical shaped interior wall of the vessel 1, and (5) the horizontal steps provided in the vessel, the air bubbles contained initially in the viscose can be completely removed while the viscose is streaming down the inside wall of the vessel 1 as a uniform film. Thus, the deaerated viscose can be supplied to spinning means through the outlet 2 as homogeneous viscose, thereby permitting uniform and nonbroken filaments to be spun through a spinnerette.

Furthermore, the temperature of the viscose during operation may vary within a wide range, but the temperature difference between the incoming viscose and viscose after flashing should be maintained in the range of 1½° C. to 10° C. for optimum results.

In the present invention, it is preferred that the slot 16 be horizontal. If a vertical slot is used, the formation of the two mutually facing surfaces of the annular girdle 9 and the annular cover 14 (Fig. 3) as two cylindrical surfaces that are perfectly circular, the maintenance of accurate spacing and the adjustment of the spacing to various dimensions as desired are extremely difficult. It is obvious that the manufacture of such apparatus would necessarily be impractical and very expensive.

Inasmuch as the invention herein described is susceptible to many variations by one skilled in the art, all such variations are intended to be included within the scope of the invention.

I claim:

1. An apparatus for deaerating a solution, comprising a container having a lower conical section, a cover having an annular depending flange adapted to fit within the conical section, a radially extending annular flange attached to the annular depending flange on the cover, an annular upper edge of the conical section being formed accurately to predetermined dimensions, a radially extending annular flange attached to the conical section such that its upper surface is in substantial radial alignment with the upper edge, means interposed between the flange attached to the cover and the flange attached to the conical section for defining a substantially annular slot, means defining an annular manifold adjacent the upper edge of the conical section, whereby a solution to be deaerated contained in the manifold may be injected through the slot so that entrapped gases are released within the container and the flange depending from the cover maintains the deaerated solution in the vicinity of the container walls, and means for removing the deaerated solution.

2. An apparatus for deaerating a solution as set forth in claim 1 wherein the means interposed between the annular flange attached to the cover and the annular flange attached to the conical section comprises an annular ring, and a vertical member attached to the outer edge of the annular ring to define a channel for containing a solution.

3. An apparatus for deaerating a solution as set forth in claim 1 wherein means is interposed between the upper annular edge and the bottom of the conical section for collecting deaerated solution.

4. An apparatus for deaerating a solution as set forth in claim 1 wherein a means is provided for connecting the container to an external vacuum source.

References Cited in the file of this patent

UNITED STATES PATENTS 2,355,057     Copeland _____ Aug. 8, 1944

FOREIGN PATENTS 722,888     Great Britain _____ Feb. 2, 1955